July 27, 1948.  V. WILLOUGHBY  2,446,164
SPRING UNIT
Filed Jan. 5, 1943
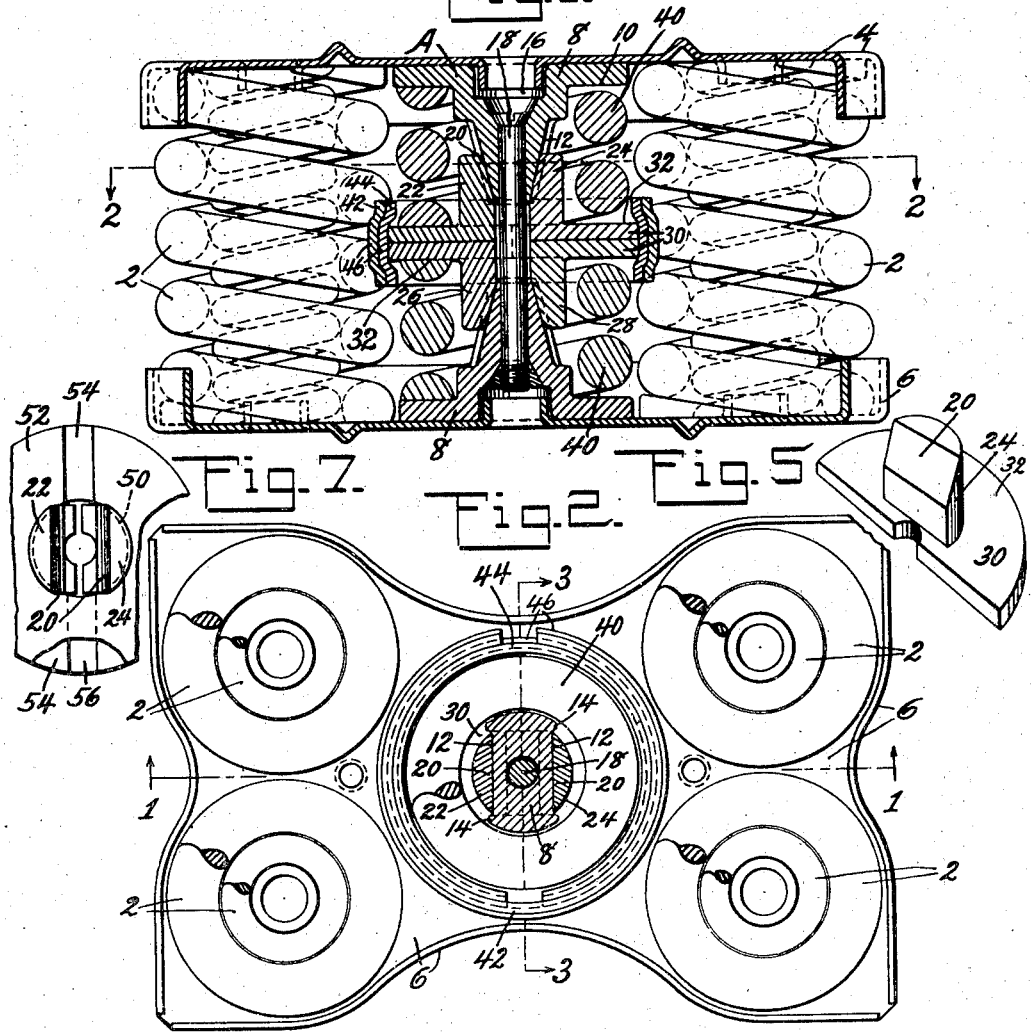
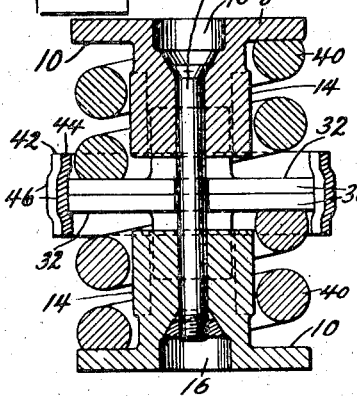
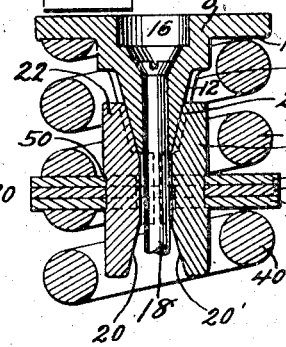
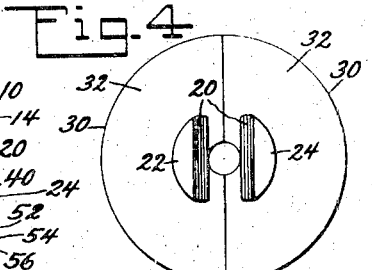
INVENTOR
Victor Willoughby
BY
ATTORNEY Patented July 27, 1948

2,446,164

UNITED STATES PATENT OFFICE 2,446,164

SPRING UNIT

Victor Willoughby, Ridgewood, N. J., assignor to American Car and Foundry Company, New York, N. Y., a corporation of New Jersey Application January 5, 1943, Serial No. 471,335

1 Claim. (Cl. 267—9)

This invention relates to a spring unit in general and in particular to such a unit modified to dampen harmonic vibration.

A principal object, therefore, of the invention is the provision of a new and improved spring unit incorporating friction elements so arranged as to modify the spring action.

A further object of the invention is the provision of a combined spring and friction unit in which certain of the friction elements are controlled by a plurality of springs, certain of which assist in supporting the load.

These and other objects of the invention will be apparent to persons skilled in the art from a study of the following description and accompanying drawings, in which:

Figure 1 is a sectional view of a spring assembly taken substantially on line 1—1 of Fig. 2;

Fig. 2 is a sectional view taken substantially on line 2—2 of Fig. 1;

Fig. 3 is a sectional view taken substantially on line 3—3 of Fig. 2;

Fig. 4 is a plan view of a pair of friction shoes;

Fig. 5 is a perspective view of one of the friction shoes;

Fig. 6 is a sectional view similar to Fig. 3 but showing a slight modification, and Fig. 7 is a plan view similar to Fig. 4 but showing the friction shoes and ring assembly of Fig. 6.

Referring now to the drawings in detail, it will be seen that the improved spring unit A has been placed in a central position in a spring nest or assembly formed by a plurality of double coil springs 2 bearing at their upper and lower ends on plates 4 and 6 respectively, these plates holding the various springs in proper position for insertion in any suitable structure such as a truck side frame.

The improved spring unit A, as clearly shown, comprises spaced apart followers 8, each formed with a spring seat portion 10 and downwardy converging friction surfaces 12 which together form a wedge. At the edge of the wedge or friction surfaces small beads 14 are left to assist in retaining the friction shoes, later to be described, in proper position. Each of the followers is also provided with a centrally located recess 16 adapted to be engaged by a flange of the spring caps, while also giving access to an assembly bolt 18 adapted to hold the parts in assembled relation. As clearly shown, the wedges are directed toward each other and are engaged by inclined friction surfaces 20 of the friction shoes 22, 24, 26 and 28. Each of these friction shoes is formed with a semi-circular flange 30 projecting laterally outward from the friction shoe and forming a spring seat 32. The friction shoes 22 and 24 constitute one pair, while shoes 26 and 28 constitute a second pair. However, it is obvious that under certain circumstances shoes 22 and 26 could be made integral, while shoes 24 and 28 could also be made integral and operate as a single pair. Interposed between the spring seats 32 of the friction shoes and the spring seats 10 of t' e followers are springs 40 which resiliently resist movement of the followers toward each other. It should also be noted that as the followers move toward each other the wedge surfaces 12 will cooperate with the wedge surfaces 20 and cause movement of the shoes 22 away from 24 and shoes 26 away from shoes 28. This outward motion of the shoes will be resisted by the frictional engagement of the springs 40 on the spring seats 32. In order to additionally resist the outward motion of the friction shoes split rings 42 and 44 are provided. These rings are preferably made of spring steel and are deformed as at 46 so as to engage each other and the flanges 30 of the friction shoes, thereby preventing displacement of the split rings relative to each other and to the friction shoes. From the preceding it will be seen that motion of the followers toward each other is resisted by springs 40 acting directly as well as frictionally through their engagement of the friction shoe flanges. Furthermore, the motion of the followers toward each other is resisted by the additional split ring springs 42 and 44 constantly urging the friction shoes inward toward the wedges and controlling their outward motion.

In the modification shown in Figs. 6 and 7 the bulk of the unit is constructed as that previously described and accordingly the same reference numerals have been applied wherever possible. In this form, however, the friction shoes are arranged without flanges and instead a groove 50 is formed in the shoes and adapted to receive split spring rings 52, 54 and 56 arranged in mutual frictional engagement and of annular form. The friction shoes on opposite sides of the wedges of the followers are made integral, as clearly shown, and will move outwardly in unison when forced to do so by the wedges of the followers. The springs 40 bear directly on split spring rings 52 and 56, therefore, these split ring springs in their outward motion must slide relatively to the bottom of the springs 40, and, therefore, they directly serve the dual function of resiliently controlling the friction shoes, while frictionally controlling movement through their direct contact with the springs 40 transmitting the load to the split rings.

From the preceding it will be obvious that inclusion of the improved spring unit in any spring assembly will assist in damping harmonic vibration since the spring characteristics will be different and will be modified by the frictional engagement between the followers and shoes and between the load carrying springs and the friction shoes, as well as by the split rings directly controlling the movement of the friction shoes. While the invention has been described more or less in detail with specific reference to two forms thereof, it will be obvious that various modifications and rearrangements of parts other than those shown and described may be made by persons skilled in the art and all such modifications and rearrangements of parts are contemplated as will fall within the scope of the appended claim defining my invention.

What is claimed is:

A spring unit comprising a pair of opposed spaced apart followers, wedge surfaces formed on each of said followers, a plurality of friction shoes engaging said wedge surfaces, spring seats formed on said followers and shoes, and springs bearing on said seats to resiliently resist motion of said followers toward each other and to frictionally resist motion of said shoes away from each other, and additional springs bearing on said friction shoes to additionally resist the motion of said shoes away from each other, said additional springs comprising split rings deformed to grip the edges of the spring seats of said friction shoes.

VICTOR WILLOUGHBY.

REFERENCES CITED

The following references are of record in the file of this patent:

UNITED STATES PATENTS

| Number | Name | Date |
| --- | --- | --- |
| 932,215 | Wilcox | Aug. 24, 1909 |
| 1,169,863 | Peycke | Feb. 1, 1916 |
| 1,503,192 | Langton | July 29, 1924 |
| 2,015,820 | Schowalter | Oct. 1, 1935 |
| 2,095,933 | Lukens | Oct. 12, 1937 |
| 2,108,124 | Hobson | Feb. 15, 1938 |
| 2,289,790 | Light | July 14, 1942 |